US012812478B2

(12) United States Patent
Lei et al.

(10) Patent No.: US 12,812,478 B2
(45) Date of Patent: Nov. 24, 2026

(54) FACILITATING CONDITIONAL FAST RETURN TO STAND ALONE ADVANCED NETWORKS AFTER VOICE FALL BACK

(71) Applicant: AT&T Intellectual Property I, L.P., Atlanta, GA (US)

(72) Inventors: Hongyan Lei, Plano, TX (US); Ye Chen, Marietta, GA (US); Wen Yang, Bellevue, WA (US); Yupeng Jia, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 373 days.

(21) Appl. No.: 17/817,150

(22) Filed: Aug. 3, 2022

(65) Prior Publication Data

US 2024/0049063 A1 Feb. 8, 2024

(51) Int. Cl.
*H04W 36/26* (2009.01)
*H04W 36/00* (2009.01)

(52) U.S. Cl.
CPC ..... *H04W 36/00222* (2023.05); *H04W 36/26* (2013.01)

(58) Field of Classification Search
CPC ........................ H04W 36/00222; H04W 36/26
See application file for complete search history.

(56) References Cited

U.S. PATENT DOCUMENTS 11,310,701 B2 4/2022 Lei et al.
2008/0225843 A1* 9/2008 Sivakumar ............ H04W 76/32 370/389
2010/0142483 A1 6/2010 Wu et al.
2015/0156699 A1* 6/2015 Keller ............... H04W 36/0022 455/438

(Continued)

FOREIGN PATENT DOCUMENTS

CN 114245418 * 3/2022

OTHER PUBLICATIONS

Non-Final Office Action received for U.S. Appl. No. 17/709,739 dated Jan. 20, 2023, 29 pages.

(Continued)

*Primary Examiner* — Sujoy K Kundu
*Assistant Examiner* — Andrew Chanul Kim
(74) *Attorney, Agent, or Firm* — Guntin & Gust, PLC; Colin Larose

(57) ABSTRACT

Facilitating conditional fast return to stand alone advanced networks after voice fall back is provided herein. Operations of a system can include controlling a first communication for a user equipment based on a connection request that comprises an indication of a fall back procedure. The connection request is associated with the user equipment via which the first communication is scheduled to occur. The operations can also include, based on a determination that the first communication has completed at the user equipment, releasing a first control of the user equipment. Further, the operations can include delaying a redirection of the user (Continued)

equipment to the network equipment for a second control of a second communication scheduled to occur at the user equipment. Delaying of the redirection can be based on a condition defined for a service executing on the user equipment determined not to be supportable by the network equipment.

20 Claims, 10 Drawing Sheets

(56) References Cited

U.S. PATENT DOCUMENTS

| | | | | |
|---|---|---|---|---|
| 2016/0353340 | A1* | 12/2016 | Yang | H04W 36/0058 |
| 2018/0255447 | A1 | 9/2018 | Chong et al. | |
| 2018/0352489 | A1* | 12/2018 | Anchan | H04W 48/16 |
| 2019/0274082 | A1 | 9/2019 | Vemuri | |
| 2020/0015128 | A1 | 1/2020 | Stojanovski et al. | |
| 2020/0245195 | A1* | 7/2020 | Zhu | H04W 36/08 |
| 2020/0413297 | A1 | 12/2020 | Chiang et al. | |
| 2021/0051529 | A1* | 2/2021 | Yuan | H04W 4/16 |
| 2021/0345185 | A1* | 11/2021 | Kodali | H04W 36/0085 |
| 2022/0322185 | A1* | 10/2022 | Patil | H04W 36/305 |
| 2023/0397072 | A1* | 12/2023 | Prabhakar | H04L 69/322 |
| 2024/0276244 | A1* | 8/2024 | Li | H04W 76/34 |
| 2025/0048192 | A1* | 2/2025 | Xu | H04W 36/00226 |

OTHER PUBLICATIONS

Non-Final Office Action received for U.S. Appl. No. 16/867,227 dated May 27, 2021, 15 pages.

3GPP, "3rd Generation Partnership Project Technical Specification Group Radio Access Network, Radio Resource Control (RRC); Protocol specification", TS 25.331 V15.4.0 (Sep. 2018), 65 pages.

3GPP, "3rd Generation Partnership Project Technical Specification Group Radio Access Network-Evolved Universal Terrestrial Radio Access (E-UTRA)-Evolved Universal Terrestrial Radio Access (E-UTRA)-Protocol specification", TS 36.331, Jun. 2018, 791 pages.

Notice of Allowance received for U.S. Appl. No. 16/867,227 dated Dec. 13, 2021, 21 pages.

3GPP, "3rd Generation Partnership Project Technical Specification Group Radio Access Network NR, NR and NG-RAN Overall Description", TS 38.300 V16.8.0, Technical Specification, Dec. 2021, 152 pages.

* cited by examiner

FACILITATING CONDITIONAL FAST RETURN TO STAND ALONE ADVANCED NETWORKS AFTER VOICE FALL BACK

TECHNICAL FIELD

This disclosure relates generally to the field of mobile communications and, for example, to returning control to a stand-alone Fifth Generation (5G), Sixth Generation (6G), or other advanced networks after voice fall back to another network.

BACKGROUND

To meet the huge demand for data centric applications, Third Generation Partnership Project (3GPP) systems and systems that employ one or more aspects of the specifications of the Fourth Generation (4G) standard for wireless communications will be extended to a Fifth Generation (5G) or other advanced standard for wireless communications. Unique challenges exist to provide levels of service associated with forthcoming 5G, or other next generation, standards for wireless communication

BRIEF DESCRIPTION OF THE DRAWINGS

Various non-limiting embodiments are further described with reference to the accompanying drawings in which.

DETAILED DESCRIPTION

Figure 1:
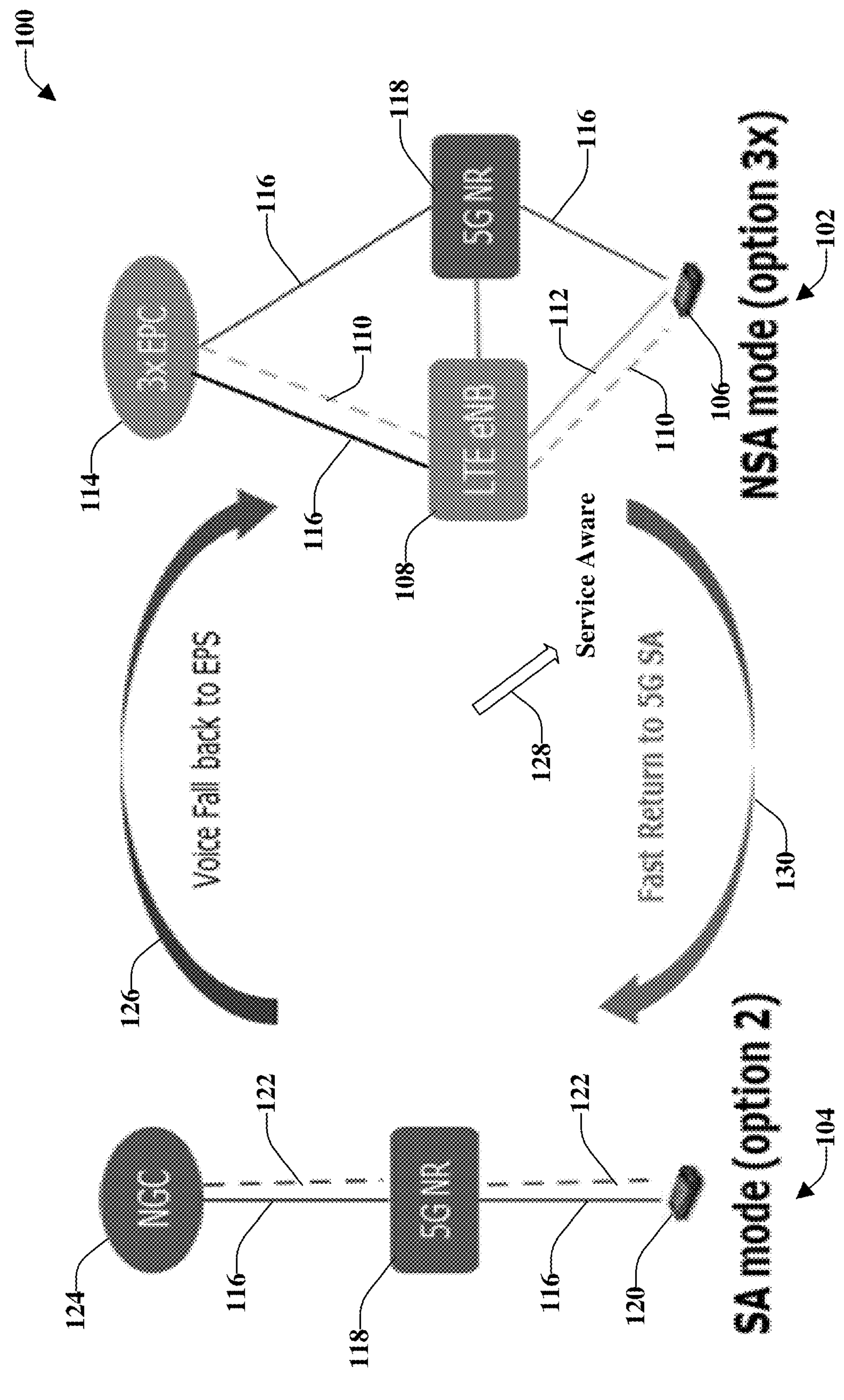
FIG. 1 illustrates an example, non-limiting, representation of a communication network showing a non-stand-alone mode and a standalone mode for advanced communications networks.

One or more embodiments are now described more fully hereinafter with reference to the accompanying drawings in which example embodiments are shown. In the following description, for purposes of explanation, numerous specific details are set forth in order to provide a thorough understanding of the various embodiments. However, the various embodiments can be practiced without these specific details (and without applying to any particular networked environment or standard).

Described herein are systems, methods, articles of manufacture, and other embodiments or implementations that can facilitate a conditional return to stand alone advanced networks after voice fall back. There are two modes for 5G deployment: NSA (Non Standalone) and SA (Standalone). NSA is for initial 5G deployment where the 5G data will use new 5G data carriers, while the control-plane stays on the mature LTE network. As 5G carrier coverage increases, both control and data will use 5G carriers, which is referred to as the SA deployment (or simply SA).

In the initial 5G deployment, the 5G network can be launched in NSA mode where the voice stays on LTE (VoLTE). When the 5G network starts migrating to SA mode, it is expected that for voice service, VoLTE Evolved Packet System (EPS) fall back (e.g., return) will be used as a transition, until the network has enough good SA NR coverage to support VoNR (Voice over New Radio). This can be similar to the early days of LTE deployment, Circuit Switched FallBack (CSFB) to 3G voice was used as a transition until LTE coverage was determined to be good enough to support VoLTE.

When the 5G voice falls back to EPS, the 5G data also falls back to 5G NSA mode, or falls back to LTE only when there is no 5G NSA coverage. According to the disclosed aspects, when the voice call is complete, it is possible that the User Equipment (UE) does not immediately go back to (e.g., return to) 5G SA mode. Instead, there can be a conditional return based on service requirements at the UE. For example, when the voice call is complete at LTE and the UE is ready to return to SA mode, considerations can be made related to the service type and/or application executing on the UE. For example, (additional) logic can be applied to determine the service type and/or application and whether it is better to stay on 5G NSA, at least temporarily, or return to LTE. This determination can be made to help ensure a smoother transition and a positive user experience.

Advantages and benefits of the disclosed embodiments include, but are not limited to, a conditional fast return with consideration of service type can improve user experience. For example, latency and speed can be considered by deciding which mode (LTE/NSA versus 5G SA) is currently best serving this service. As another example benefit, dynamic adjustment of NSA and/or SA switching (return to SA) based upon end user's need and context can be provided.

According to an embodiment, a method can include receiving, from first network equipment by second network equipment comprising a memory and a processor, a connection request that includes an indication of a fall back procedure. The connection request is associated with a user equipment via which a voice communication is scheduled to occur. The method can also include facilitating, by the second network equipment, control of the voice communication for the user equipment. Further, the method can include, based on a first determination that the voice communication has completed at the user equipment and based on a second determination that a condition at third network equipment fails to satisfy a defined condition associated with an application executing at the user equipment, delaying, by the second network equipment, a release of the control of the user equipment from the second network equipment to the third network equipment.

In an example, the first network equipment is configured to operate according to a new radio network communication protocol. In another example, the second network equipment is deployed in a standalone deployment architecture. In yet another example, the first network equipment is configured to operate according to a long term evolution network communication protocol.

According to some implementations, the method can include, after expiration of a defined interval and based on a third determination that the application executing at the user equipment has completed, triggering, by the second network equipment, the release of the control of the user equipment from the second network equipment. Further to these implementations, the method can include redirecting, by the second network equipment, the user equipment to the third network equipment. The third network equipment can be selected based on a capability of the user equipment. According to some implementations, prior to triggering the release of the user equipment, the method can include evaluating, by the second network equipment, the capability of the user equipment based on the first determination that the voice communication has completed at the user equipment.

In an example, receiving the indication of the fall back procedure can include receiving an information element that includes a release cause code. In another example, the information element is a first information element, and redirecting the user equipment to the third network equipment can include receiving a second information element that includes redirected carrier information.

The defined condition can be identified for an uplink transmission. Alternatively, or additionally, the defined condition can be identified for a downlink transmission. In some implementations, the application executing at the user equipment is a latency and interruption sensitive application, and the defined condition is a latency criterion of network traffic. In some implementations, the defined condition is a throughput criterion of network traffic utilized by the application executing on the user equipment. Alternatively, or additionally, the defined condition is a delay jitter criterion of network traffic utilized by the application executing on the user equipment. In some additional or alternative implementations, the defined condition is a packet loss threshold associated with the application executing on the user equipment.

Another embodiment relates to a system that includes a processor and a memory that stores executable instructions that, when executed by the processor, facilitate performance of operations. The operations can include controlling a first communication for a user equipment based on a connection request that includes an indication of a fall back procedure. The connection request is associated with the user equipment via which the first communication is scheduled to occur. Further, the connection request is received from network equipment. The operations can also include, based on a determination that the first communication has completed at the user equipment, releasing a first control of the user equipment. Further, the operations can include delaying a redirection of the user equipment to the network equipment for a second control of a second communication scheduled to occur at the user equipment. Delaying of the redirection can be based on a condition defined for a service executing on the user equipment determined not to be supportable by the network equipment.

In an implementation, the indication includes a first information element that includes a release cause code. Further to this implementation, redirecting the user equipment includes receiving a second information element that includes redirected carrier information.

According to some implementation the determination is a first determination. Further, the operations can include, after a defined interval and based on a second determination that the service executing on the user equipment has completed, releasing a control of the user equipment to the network equipment.

A further embodiment relates to a non-transitory machine-readable medium, comprising executable instructions that, when executed by a processor of first network equipment, facilitate performance of operations. The operations can include determining that a first communication of a user equipment is to be controlled by second network equipment based on a connection request that includes an indication of a fall back procedure. The operations can also include enabling control of the first communication by the second network equipment for a duration of the first communication. Further, based on a first determination that the first communication has completed at the user equipment and that third network equipment fails to support a service criterion associated with an application executing at the user equipment, the operations can include delaying a release of the control of the user equipment by the second network equipment. The operations can also include, after expiration of a delay timer and based on a second determination that the application has completed executing at the user equipment, transferring the control of the user equipment to the third network equipment by the second network equipment.

According to an implementation, the operations can include, prior to the determining, receiving the indication of the fall back procedure and an information element that includes a release cause code. In an example, the service criterion is defined for at least one of an uplink transmission or a downlink transmission.

FIG. 1 illustrates an example, non-limiting, representation of a communication network showing a non-stand-alone (NSA) mode 102 and a standalone (SA) mode 104 for advanced communications networks. The illustrated NSA mode 102 comprises a UE 106 that connects to network equipment 108 (e.g., LTE eNB equipment) via an LTE C-plane 110 and an LTE U-plane 112. The LTE eNB equipment 108 communicates to an EPC 114 via the LTE C-Plane 110 and a 5G U-plane 116. In addition, the UE 106 connects to network equipment 118 (e.g., 5G NR equipment) via the 5G U-plane 116. The 5G NR equipment 118 communicates with the EPC 114 via the 5G U-plane 116.

The illustrated SA mode 104 comprises equipment 120 that communicates to the NR equipment 118 via the 5G U-plane 116 and a 5G C-plane 122. The 5G NR equipment 118 communicates with a Next Generation Core (NGC) 124 via the 5G U-plane 116 and the 5G C-plane 122.

In the SA mode 104, there can be voice fall back to EPS, as indicated by arrow 126. In the NSA mode 102, upon or after the voice call completes, the LTE eNB equipment 108 implements (additional) logic and/or intelligence, referred to as service aware logic 128. The service aware logic 128 can be utilized to determine the service type associated with the UE 106 and determine whether to immediately return to the SA mode 104 or delay return to the SA mode 104. The service aware logic 128 can be implemented prior to a "Radio Resource Control (RRC) Release and Redirect" or an "IRAT Handover" to 5G SA mode is triggered.

If the service aware logic 128 determines that it would be beneficial for the UE (e.g., an improved user experience) to stay in the NSA mode 102, at least one timer (or other manner of tracking a delay interval) is started while the UE 106 remains in the NSA mode 102. Upon or after expiration of the timer (or delay interval), the service aware logic 128 can evaluate the service and/or application executing on the UE 106 and, if conditions have not changed, the timer can be re-started (or another timer can be started) and the determination whether to return to the SA mode 104 can be made upon or after expiration of the second (or subsequent) timers. Upon or after expiration of a timer (e.g., an initial time period or subsequent time periods), if the service aware logic 128 determines that conditions have changed, the UE can return to the SA mode 104 and the Release and Redirect or handover to 5G SA mode is triggered. Upon or after the Release and Redirect or handover completes, the data transmission will continue. Accordingly, there can be a conditional fast return to 5G SA, as indicated by arrow 130. The fast return procedure can be an "RRC release and redirect" or an "IRAT handover."

Figure 2:
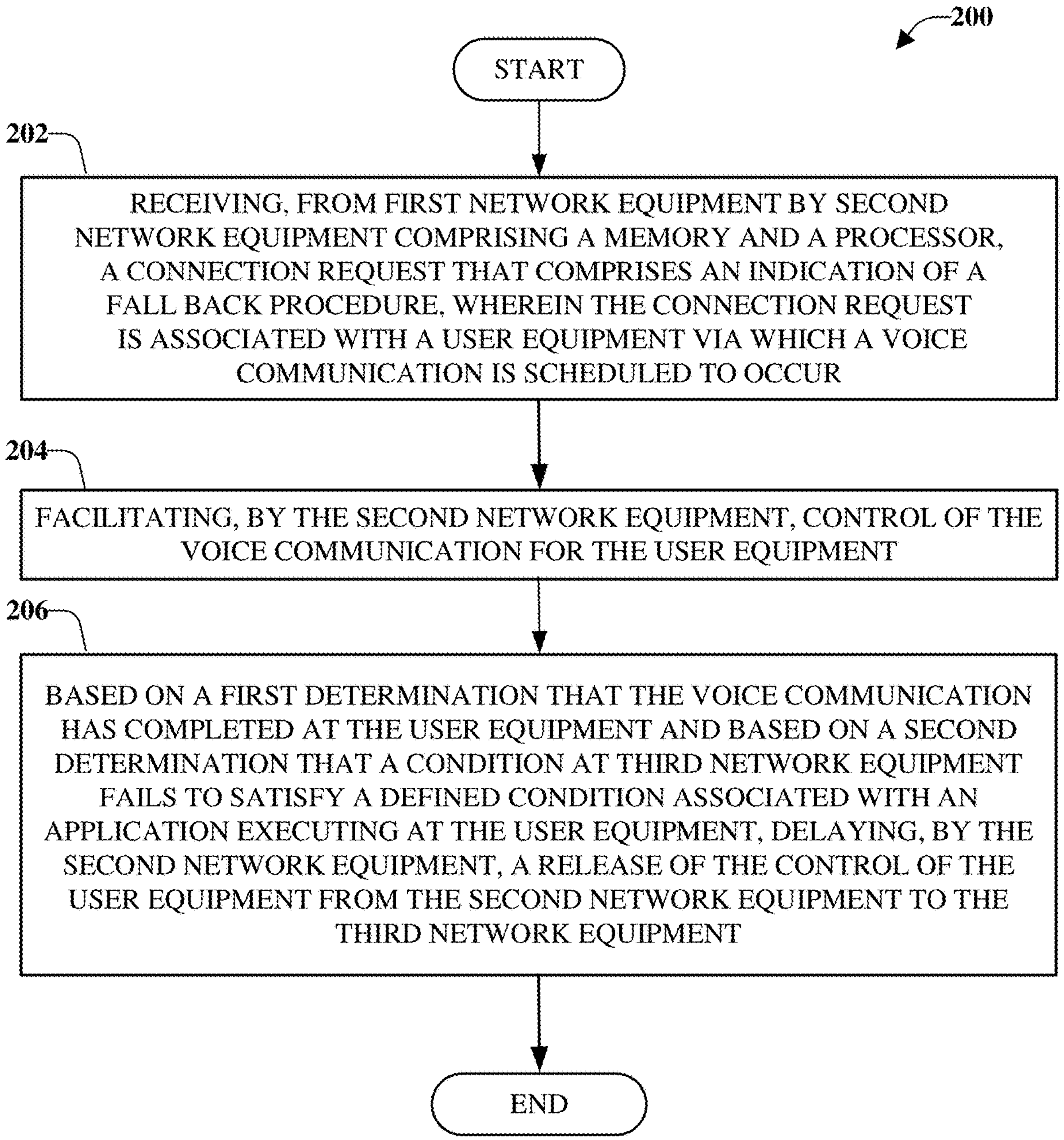
FIG. 2 illustrates a flow diagram of an example, non-limiting, computer-implemented method for facilitating conditional fast return to stand alone advanced networks after voice fall back in accordance with one or more embodiments described herein.

FIG. 2 illustrates a flow diagram of an example, non-limiting, computer-implemented method 200 for facilitating conditional fast return to stand alone advanced networks after voice fall back in accordance with one or more embodiments described herein. Repetitive description of like elements employed in other embodiments described herein is omitted for sake of brevity. The computer-implemented method 200 can be implemented by a system including a memory and a processor, user equipment including memory and a processor, network equipment including a memory and a processor, a network controller including a memory and a processor, or another computer-implemented device including a memory and a processor.

The computer-implemented method 200 starts at 202 with receiving, from first network equipment by second network equipment comprising a memory and a processor, a connection request that comprises an indication of a fall back procedure. The connection request can be associated with a UE via which a voice communication is scheduled to occur.

At 204, control of the voice communication for the UE can be facilitated by the second network equipment. For example, the control of the communication can be facilitated by the second network equipment for a duration of the voice communication.

At 206, the second network equipment can determine whether a release of control of the UE from the second network equipment to the third network equipment (or back to the first network equipment) should be delayed. For example, the delay can be based on a first determination that the voice communication has completed at the UE and based on a second determination that a condition at the third network equipment fails to satisfy a defined condition associated with an application executing at the UE.

According to an implementation, the delay can be based on service aware location (e.g., the service aware logic 128) that evaluates one or more service characteristics. Such service characteristics include, but are not limited to, latency parameters (e.g., real time traffic versus non real time traffic), throughput parameters, delay jitter parameters, and/or packet loss parameters. It is noted that the various parameters and/or one or more service characteristics can be defined for an uplink transmission, a downlink transmission, or both an uplink transmission and a downlink transmission.

According to some implementations, the second network equipment (e.g., the eNB) can make the determination based on the known information (e.g., available spectrum with NSA mode versus SA mode), and/or the latest 5G SA service quality information provided by the gNB (e.g., the latest average latency statistics, the latest average throughput statistics, the latest average jitter statistics, the latest average packet loss statistics, and so forth), for this given service in 5G SA.

For example, the latest 5G SA service quality information provided by gNB is a generic concept where the gNB shares how well the 5G SA system service for a given service type is in terms of latency, jitter, throughput, packet loss, and so forth. According to some implementations, the information can be sent via X2 interface from gNB to eNB. In some implementations, the information can be per service type (e.g., Quality of Service (QoS) Class Identifier (QCI), 5G QoS Identifier (5QI), Service Profile Identifier (SPID), and so on). In accordance with some implementations, the information could be distinguished for uplink and downlink, or for one direction (e.g., either uplink or downlink). The information can be shared periodically with adjustable periodicity to balance between X2 load versus freshness of the data according to some implementations. Further, the service quality information can be defined to various criteria including, but not limited to, moving average latency, jitter, throughput and packet loss currently observed at 5G NR SA system for a given service type, according to some implementations.

According to an example, the on-going service can be a real-time application that is sensitive to latency and interruption. Either Release with Redirect or handover to perform the fast return will introduce the interruption to the ongoing service. In this case, delay the return. Thus, the UE is retained on LTE data until the delay and interruption sensitive application is finished, then return the UE to SA.

In another example, at a defined location, the NSA has higher speed than the SA given the spectrum availability for NSA versus SA. If the application prefers higher speed, the UE is retained on the LTE data. Upon or after the the high-speed application is finished, the UE is returned to SA.

In yet another example, if the last available latency and/or throughput performance reported by gNB at SA cannot meet the requirements for this service and/or the threshold is worse than what the eNB observed at the NSA system, the eNB decides to keep the ongoing service at LTE with NSA mode.

Figure 3:
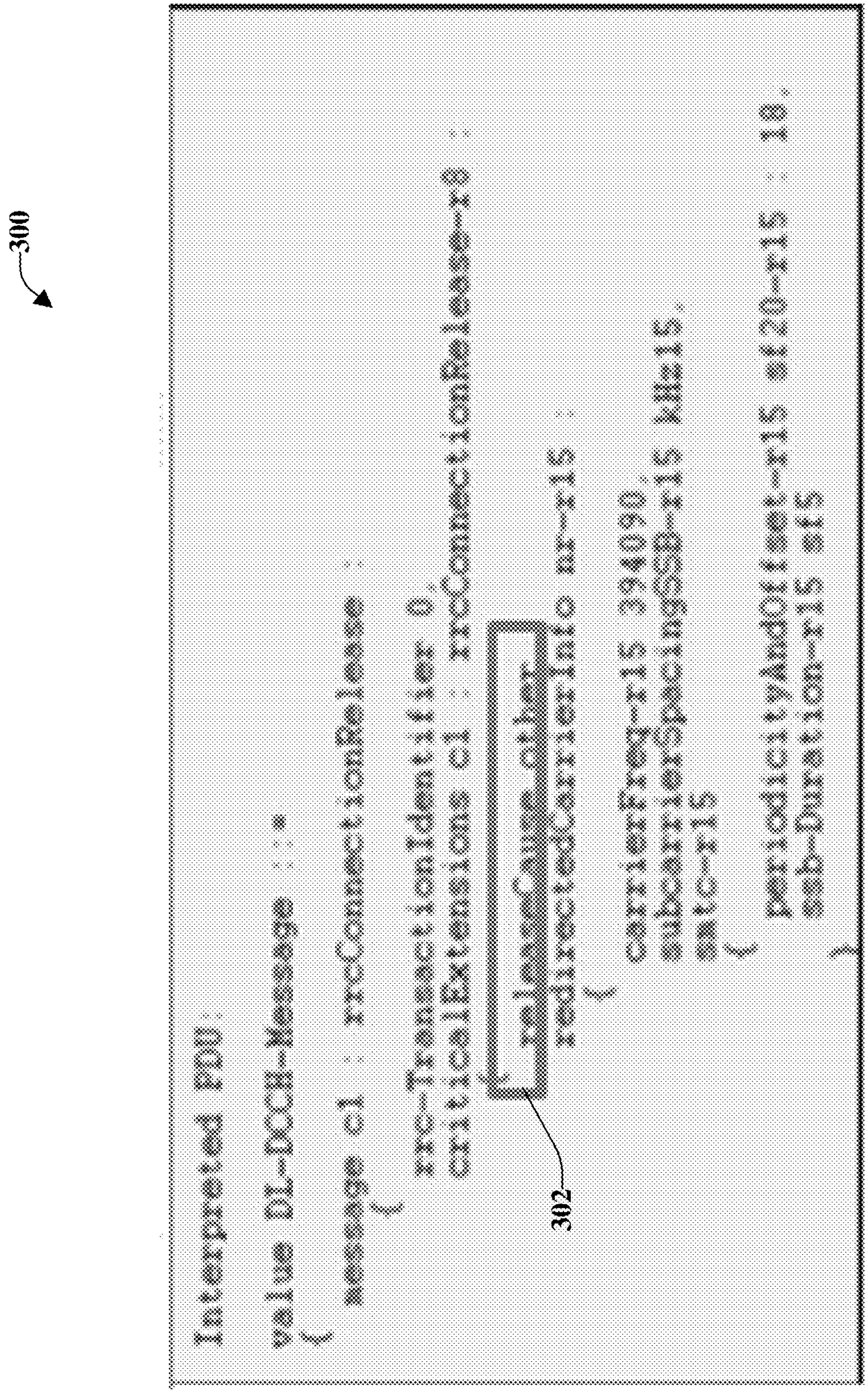
FIG. 3 illustrates an example, non-limiting, radio resource control release cause message in accordance with one or more embodiments described herein.

FIG. 3 illustrates an example, non-limiting, radio resource control release (RRC) cause message 300 in accordance with one or more embodiments described herein. Upon or after the voice call is released on LTE, the LTE eNB can move the UE towards the SA using the RRC release cause message. As illustrated, the RRC cause message can indicate "releaseCause_other" 302. In implementation, the release cause code can be more specific. For example, the release cause code can be "fast return to NR," "service trigger fast return to NR," "load based fast return to NR," and so on.

According to some implementations, the "releaseCause_other" 302 can be included as part of an LTE RRC over the air (LTE RRC OTA) packet as a downlink dedicated control channel RRC connection release (DL-DCCH/RRC-ConnectionRelease).

Figure 4:
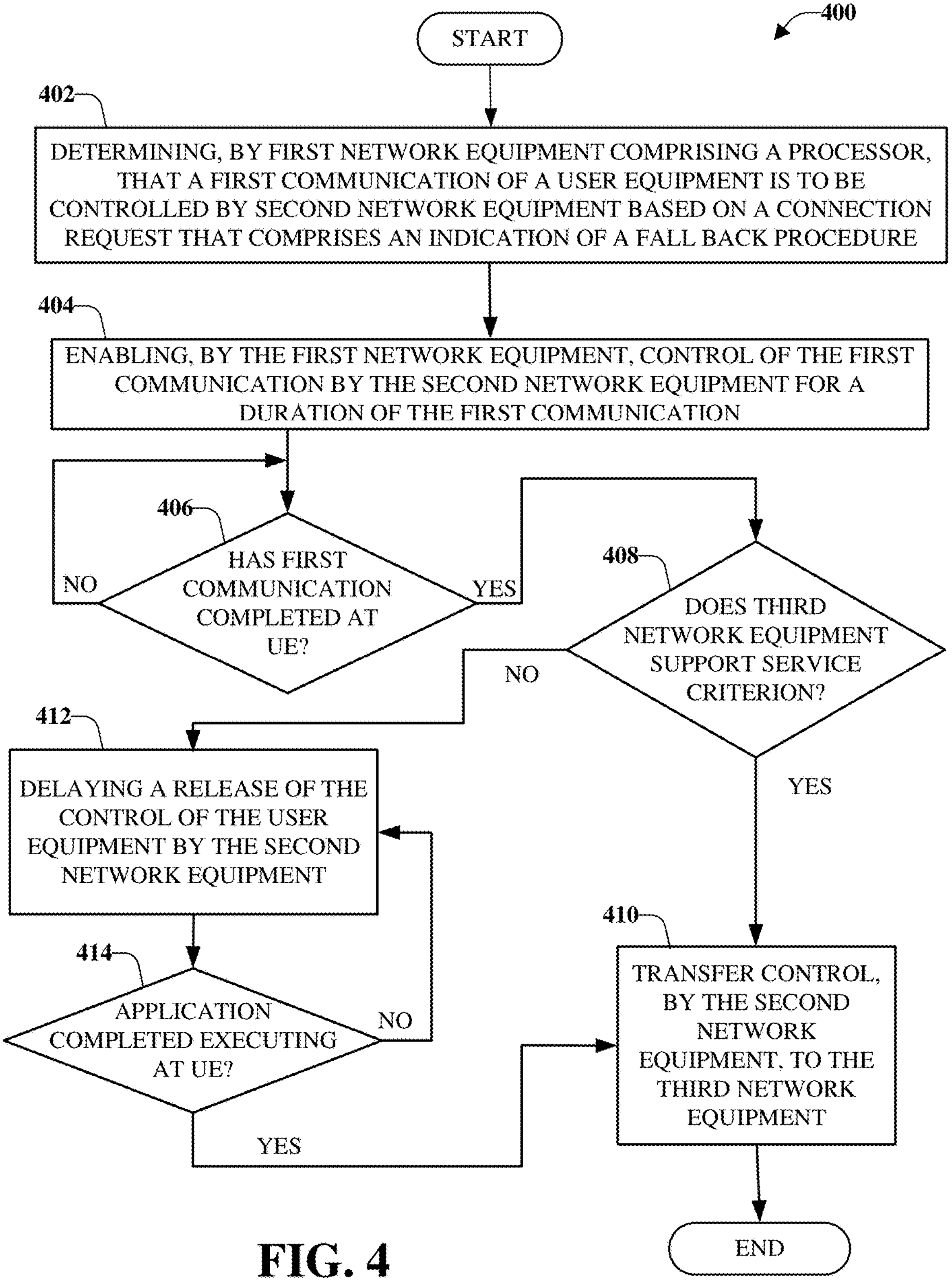
FIG. 4 illustrates a flow diagram of an example, non-limiting, computer-implemented method for selectively delaying a fast return to stand alone advanced networks after voice fall back in accordance with one or more embodiments described herein.

FIG. 4 illustrates a flow diagram of an example, non-limiting, computer-implemented method 400 for selectively delaying a fast return to stand alone advanced networks after voice fall back in accordance with one or more embodiments described herein. Repetitive description of like elements employed in other embodiments described herein is omitted for sake of brevity. The computer-implemented method 400 can be implemented by a system including a memory and a processor, UE including memory and a processor, network equipment including a memory and a processor, a network controller including a memory and a processor, or another computer-implemented device including a memory and a processor.

The computer-implemented method 400 starts at 402 when first network equipment comprising a processor determines that a first communication of a UE is to be controlled by second network equipment based on a connection request that comprises an indication of a fall back procedure. According to some implementations, prior to the determination at 402 the indication of the fall back procedure and an information element that comprises a release cause code can be received. At 404 the first network equipment enables control of the first communication by the second network equipment for a duration of the first communication.

At 406 a determination is made whether the first communication has completed at the UE. If the communication has not completed ("NO"), the computer-implemented method 400 returns to 406 until the first communication is completed. Alternatively, if it is determined that the first communication has completed ("YES"), at 408, a determination is made whether third network equipment supports a service criterion associated with an application executing at the UE. According to an implementation, the service criterion is defined for at least one of an uplink transmission or a downlink transmission, or for both the uplink transmission and the downlink transmission.

If the determination at 408 is that the third network equipment supports the service criterion ("YES"), control of the UE can be transferred to the third network equipment by the second network equipment, at 410, and the computer-implemented method 400 ends.

Alternatively, if the determination is that the third network equipment fails to support the service criterion ("NO"), a release of the control of the UE by the second network equipment is delayed, at 412. To facilitate the delay, a delay timer can be started. Upon or after a delay interval has expired (e.g., expiration of the delay timer), at 414, a determination is made whether the application has completed executing at the UE.

If the application has not completed executing at the UE ("NO"), the computer-implemented method 400 returns to 412 and the release of control continues to be delayed. For example, another delay timer can be started. When it is determined, at 414, that the application has completed executing at the UE, the computer-implemented method 400 continues at 410 and control of the UE can be transferred to the third network equipment by the second network equipment and the computer-implemented method 400 ends.

Figure 5:
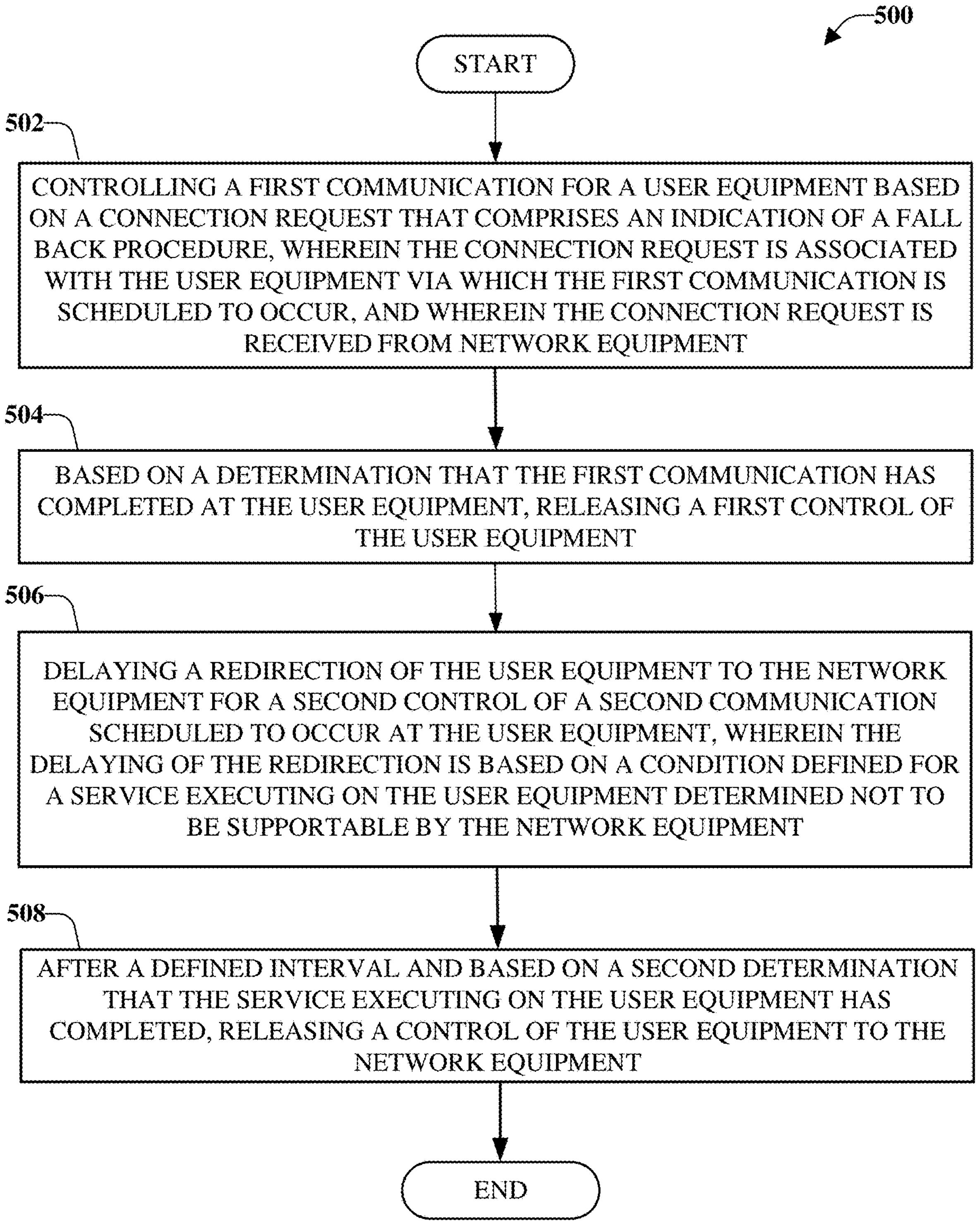
FIG. 5 illustrates a flow diagram of an example, non-limiting, computer-implemented method for delaying a redirection of user equipment based on a conditional fast return process in accordance with one or more embodiments described herein.

FIG. 5 illustrates a flow diagram of an example, non-limiting, computer-implemented method 500 for delaying a redirection of a UE based on a conditional fast return process in accordance with one or more embodiments described herein. Repetitive description of like elements employed in other embodiments described herein is omitted for sake of brevity. The computer-implemented method 500 can be implemented by a system including a memory and a processor, UE including memory and a processor, network equipment including a memory and a processor, a network controller including a memory and a processor, or another computer-implemented device including a memory and a processor.

The computer-implemented method 500 starts at 502 when a first communication for a UE is controlled based on a connection request that comprises an indication of a fall back procedure. The connection request can be associated with the UE via which the first communication is scheduled to occur. Further, the connection request can be received from network equipment.

At 504, based on a determination that the first communication has completed at the UE, a first control of the UE can be released. At 506, a redirection of the UE to the network equipment for a second control of a second communication scheduled to occur at the UE can be selectively delayed. For example, the delaying of the redirection can be based on a condition defined for a service executing on the UE determined not to be supportable by the network equipment. According to some implementations, the indication can include a first information element that comprises a release cause code and redirecting the UE can include receiving a second information element that comprises redirected carrier information.

The condition defined for the service executing on the UE can be identified for an uplink transmission, identified for a downlink transmission, or identified for both the uplink transmission and the downlink transmission. The service executing on the UE can be a latency and interruption sensitive application, and the condition can be a latency criterion of network traffic. In another example, the condition can be a throughput criterion of network traffic utilized by the application executing on the UE. In yet another example, the condition can be a delay jitter criterion of network traffic utilized by the application executing on the UE. In another example, the condition can be a packet loss threshold associated with the application executing on the UE. In some cases, the condition can be more than one condition (e.g., a combination of conditions).

According to some implementations, the computer-implemented method 500 can include, at 508, after a defined interval and based on a second determination that the service executing on the UE has completed, releasing a control of the UE to the network equipment.

Figure 6:
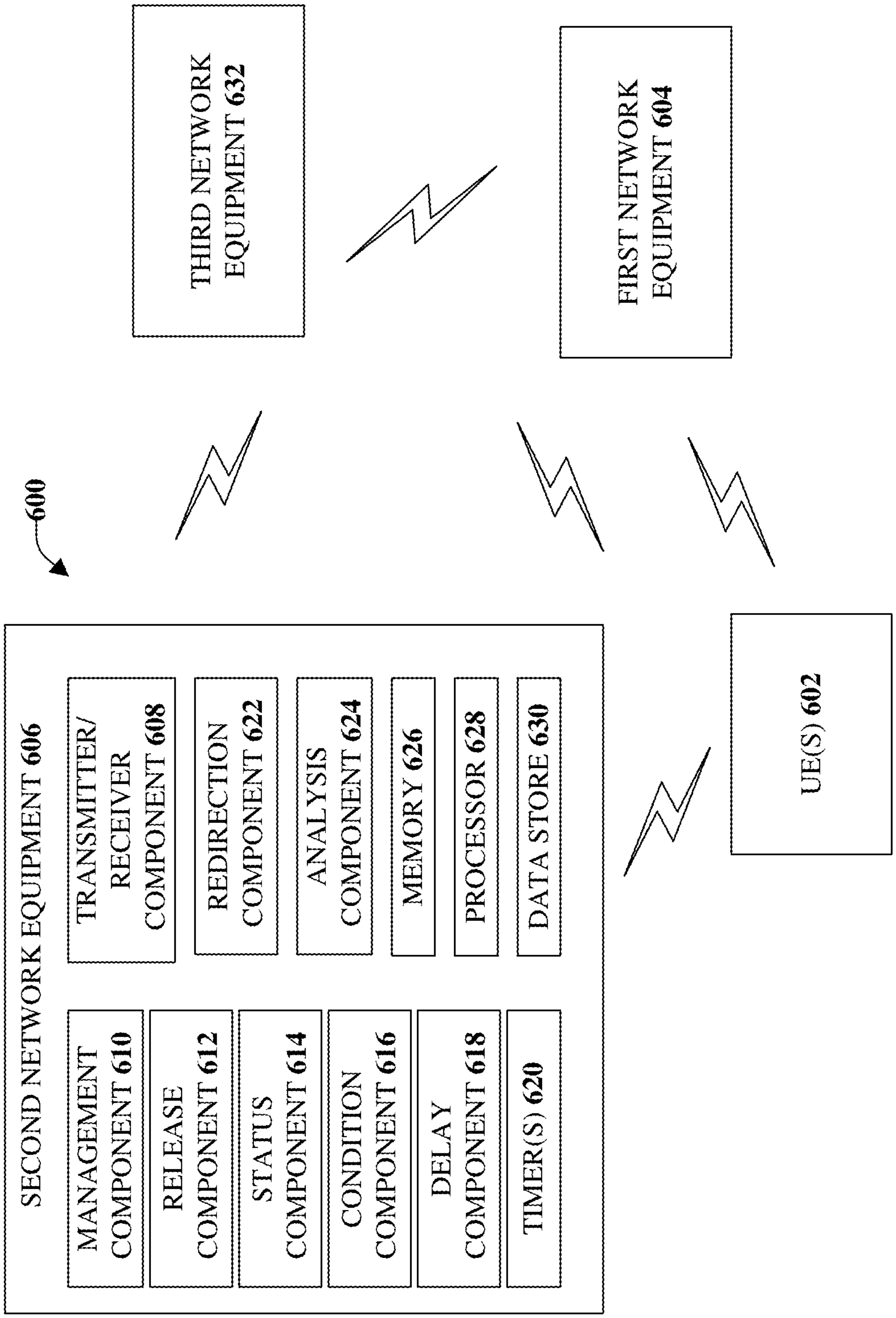
FIG. 6 illustrates an example, non-limiting, system that facilitates conditional fast return in accordance with one or more embodiments described herein.

FIG. 6 illustrates an example, non-limiting, system 600 that facilitates conditional fast return in accordance with one or more embodiments described herein. The system 600 can comprise one or more of the components and/or functionality of the system 100, the computer-implemented method 200, the computer-implemented method 400, the computer-implemented method 500, and vice versa.

It is noted that various embodiments are discussed with respect to a fifth generation network communication protocol (e.g., 5G), however, the disclosed aspects are not limited to this implementation. Instead, the disclosed embodiments can be implemented in a 5G network communication protocol, a sixth generation (6G) network communication protocol, a New Radio (NR) communication protocol, and/or other advanced communication protocols.

Aspects of systems (e.g., the system 600 and the like), equipment, UE (UE), network equipment, devices, apparatuses, and/or processes explained in this disclosure can constitute machine-executable component(s) embodied within machine(s) (e.g., embodied in one or more computer readable mediums (or media) associated with one or more machines). Such component(s), when executed by the one or more machines (e.g., computer(s), computing device(s), virtual machine(s), and so on) can cause the machine(s) to perform the operations described.

The system 600 can include a UE 602, first network equipment 604, and second network equipment 606. It is noted that although only one UE and two network equipment are illustrated and described for purposes of simplicity, the system can include more than one UE and/or more than two network equipment.

In various embodiments, the UE 602 or network equipment (e.g., the first network equipment 604, the second network equipment 606) can be any type of component, machine, device, facility, apparatus, and/or instrument that comprises a processor and/or can be capable of effective and/or operative communication with a wired and/or wireless network. Components, machines, apparatuses, devices, facilities, and/or instrumentalities that can comprise the UE 602 and/or network equipment can include tablet computing devices, handheld devices, server class computing machines and/or databases, laptop computers, notebook computers, desktop computers, cell phones, smart phones, consumer appliances and/or instrumentation, industrial and/or commercial devices, hand-held devices, digital assistants, multimedia Internet enabled phones, multimedia players, and the like.

As illustrated in FIG. 6, the second network equipment 606 can include a transmitter/receiver component 608, a management component 610, a release component 612, a status component 614, a condition component 616, a delay component 618, at least one timer 620, a redirection component 622, an analysis component 624, at least one memory 626, at least one processor 628, and at least one data store 630. It is noted that although discussed with respect to the second network equipment 606, the various components discussed herein can be included in other network equipment (e.g., the first network equipment 604, a third network equipment, and so on).

The transmitter/receiver component 608 can receive, from the first network equipment 604, a connection request that comprises an indication of a fall back procedure, which can be evaluated by the release component 612. The connection request can be associated with the UE 602 based on a voice communication determined to be scheduled to occur (e.g., a voice call is initiated, a voice call is received, and so on). The fall back procedure can be either an "RRC release and redirect" or an "IRAT Handover." According to some implementations, the indication comprises a first information element that comprises a release cause code.

Based on the indication of the fall back procedure, the management component 610 can facilitate control of the voice communication for the UE 602. For example, the voice call can be handled by the second network equipment 606 while other communication (e.g., data communication) is handled by the first network equipment 604.

The status component 614 can determine whether the voice call has completed at the UE 602. According to some implementations, the determination by the status component 614 can be based on information received from the UE 602. According to an alternative, or additional, implementation, the determination by the status component 614 can be based on information received from network equipment that is facilitating the voice call between the UE 602 and another device and/or other equipment.

Based on a determination by the status component 614 that the voice communication has completed at the UE 602, the condition component 616 can evaluate at least one condition defined for a service executing on the UE 602. Thus, the status component 614 can evaluate a condition defined for a service executing on the UE 602 to determine if the condition is supportable by, for example, third network equipment 632. For example, the evaluation can be related to latency, throughput, delay jitter, packet loss, and so on (or a combination thereof). The evaluation by the condition component 616 can compare the condition defined for the service with the ability of the third network equipment 632, to which the UE 602 is to be redirected.

If the condition component 616 determines the third network equipment 632 is not currently able to provide the adequate amount of support or has less support than that offered by the second network equipment 606, it can be determined by the delay component 618 that the UE 602 should remain, at least temporarily, at the second network equipment 606. Accordingly, the delay component 618 can start the at least one timer 620 that has a defined interval. The defined interval can be an amount of time that should be reasonable for processes to complete at the UE 602. Further, the defined interval can be configurable.

Upon or after the expiration of the at least one timer 620 another determination can be made by the condition component 616 related to whether the conditions have changed. If the conditions have not changed, the delay component 618 can start another timer (or the same timer), which can have the same time period as the previous delay or another time period.

After expiration of the at least one timer 620 (or a subsequent timer), if the condition component 616 determines that the service executing on the UE has completed, the redirection component 622 can release a control of (e.g., redirect) the UE to the third network equipment 632. According to some implementations, the indication comprises a first information element that comprises a release cause code and redirecting the UE comprises receiving a second information element that comprises redirected carrier information.

It is noted that according to some implementations, the release of the UE can be back to the third network equipment 632 and/or the first network equipment 604 (or other network equipment). Thus, in some cases, the third network equipment 632 and the first network equipment 604 are the same network equipment.

According to some implementations, upon or after the status component 614 determines the voice call has completed, the analysis component 624 can evaluate a capability of the UE 602. For example, the analysis component 624 can determine whether or not the UE 602 is able to support communication with a defined band on a standalone network. Further to these implementations, the redirection component 622 can redirect the UE 602 based on whether or not the UE 602 can support communication with the defined band on the standalone network, as determined by the analysis component 624.

According to some implementations, the determination by the analysis component 624 can be that the UE 602 can support multiple advanced network bands. Thus, the redirection component 622 can select an advanced network band from the multiple advanced network bands. The selection by the redirection component 622 can be based on a second determination that the advanced network band comprises a priority that satisfies a defined priority level as compared to other advanced network bands of the multiple advanced network bands other than the advanced network band.

The at least one memory 626 can be operatively connected to the at least one processor 628. The at least one memory 626 and/or the at least one data store 630 can store executable instructions that, when executed by the at least one processor 628 can facilitate performance of operations. Further, the at least one processor 628 can be utilized to execute computer executable components stored in the at least one memory 626 and/or the at least one data store 630.

For example, the at least one memory 626 can store protocols associated with facilitating conditional fast return after fall back as discussed herein. Further, the at least one memory 626 can facilitate action to control communication between the system 600, other systems, equipment, network equipment, the UE 602, and/or other UEs such that the system 600 can employ stored protocols and/or processes to facilitate conditional fast return as described herein.

It should be appreciated that data stores (e.g., memories) components described herein can be either volatile memory or nonvolatile memory, or can include both volatile and nonvolatile memory. By way of example and not limitation, nonvolatile memory can include read only memory (ROM), programmable ROM (PROM), electrically Programmable ROM (EPROM), Electrically Erasable ROM (EEPROM), or flash memory. Volatile memory can include Random Access Memory (RAM), which acts as external cache memory. By way of example and not limitation, RAM is available in many forms such as Synchronous RAM (SRAM), Dynamic RAM (DRAM), Synchronous DRAM (SDRAM), Double Data Rate SDRAM (DDR SDRAM), Enhanced SDRAM (ESDRAM), Synchlink DRAM (SLDRAM), and Direct Rambus RAM (DRRAM). Memory of the disclosed aspects are intended to include, without being limited to, these and other suitable types of memory.

The at least one processor 628 can facilitate conditional fast return as discussed herein. The at least one processor 628 can be a processor dedicated to analyzing and/or generating information received, a processor that controls one or more components of the system 600, and/or a processor that both analyzes and generates information received and controls one or more components of the system 600.

Figure 7:
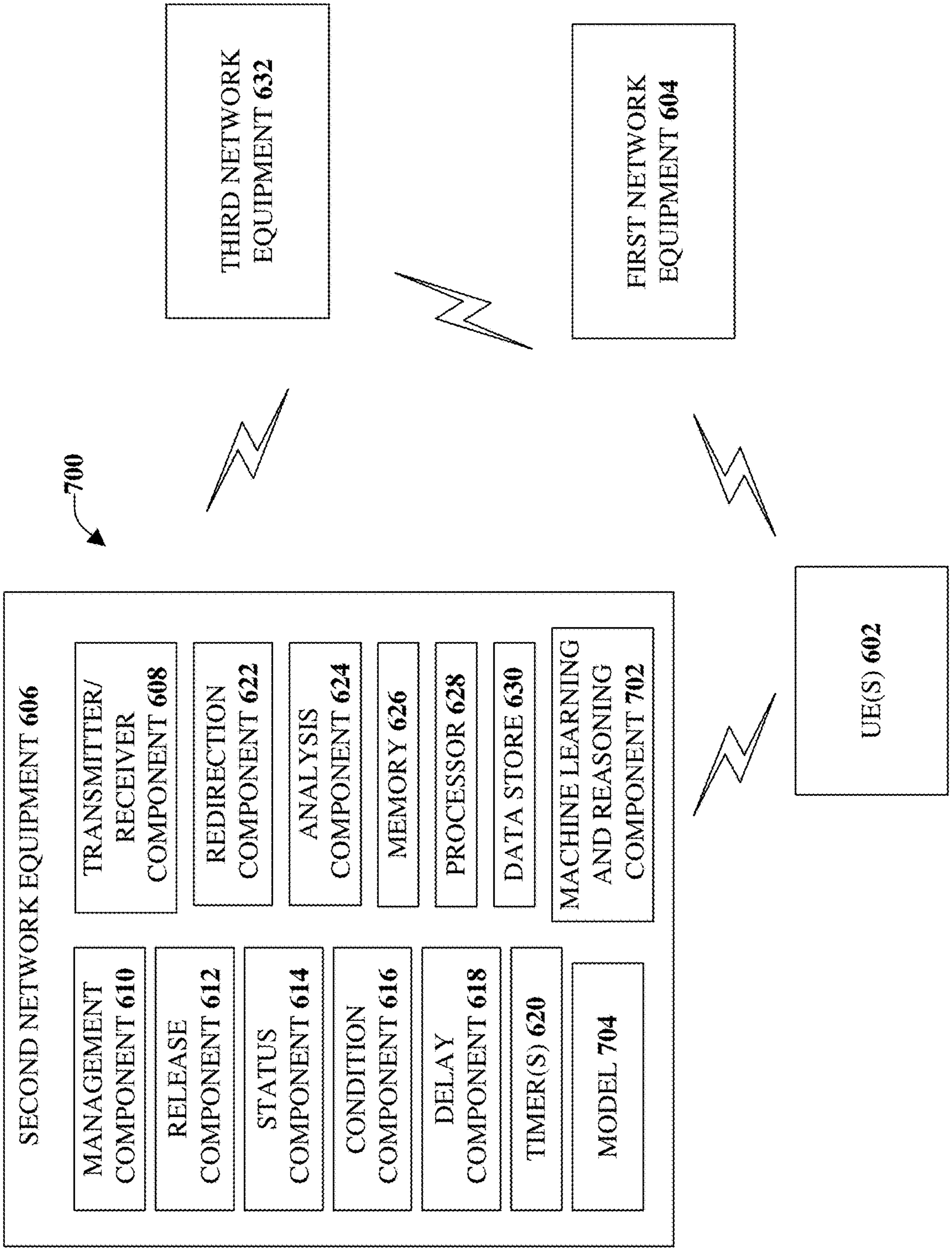
FIG. 7 illustrates an example, non-limiting, system that employs automated learning that trains a model to facilitate one or more of the disclosed aspects in accordance with one or more embodiments described herein.

FIG. 7 illustrates an example, non-limiting, system 700 that employs automated learning that trains a model to facilitate one or more of the disclosed aspects in accordance with one or more embodiments described herein. Repetitive description of like elements employed in other embodiments described herein is omitted for sake of brevity. The system 700 can comprise one or more of the components and/or functionality of the system 100, the computer-implemented method 200, the computer-implemented method 400, the computer-implemented method 500, the system 600, and vice versa.

The system 700 can utilize machine learning to train a model to identify an opportunity to selectively delay a fast return to stand alone advanced networks after voice fall back. The model can be trained to a defined confidence level. As illustrated, the system 700 can comprise a machine learning and reasoning component 702 that can be utilized to automate one or more of the disclosed aspects based on training a model 704. The machine learning and reasoning component 702 can employ automated learning and reasoning procedures (e.g., the use of explicitly and/or implicitly trained statistical classifiers) in connection with performing inference and/or probabilistic determinations and/or statistical-based determinations in accordance with one or more aspects described herein.

For example, the machine learning and reasoning component 702 can employ principles of probabilistic and decision theoretic inference. Additionally, or alternatively, the machine learning and reasoning component 702 can rely on predictive models (e.g., the model 704) constructed using automated learning and/or automated learning procedures. Logic-centric inference can also be employed separately or in conjunction with probabilistic methods.

The machine learning and reasoning component 702 can infer whether network equipment, to which a UE is to fall back, is appropriate for a current condition at the UE, or whether the fall back should be delayed, at least temporarily. The machine learning and reasoning component 702 can determine an appropriate delay time. Based on this knowledge, the machine learning and reasoning component 702 can make an inference based on whether it would be better to retain the UE at the current network equipment, at least temporarily or whether the fallback procedure can continue (e.g., immediately fallback), and so on.

As used herein, the term "inference" refers generally to the process of reasoning about or inferring states of a system, a component, a module, an environment, and/or devices from a set of observations as captured through events, reports, data and/or through other forms of communication. Inference can be employed to identify when corrective measures, such as delaying a fast return, implementing more than one delay time interval, when and to which network equipment to redirect the UE, and so on. The inference can be probabilistic. For example, computation of a probability distribution over states of interest based on a consideration of data and/or events. The inference can also refer to techniques employed for composing higher-level events from a set of events and/or data. Such inference can result in the construction of new events and/or actions from a set of observed events and/or stored event data, whether or not the events are correlated in close temporal proximity, and whether the events and/or data come from one or several events and/or data sources. Various classification schemes and/or systems (e.g., support vector machines, neural networks, logic-centric production systems, Bayesian belief networks, fuzzy logic, data fusion engines, and so on) can be employed in connection with performing automatic and/or inferred action in connection with the disclosed aspects.

The various aspects (e.g., in connection with conditional fast return in 5G communication networks, 6G communication networks, new radio communication networks, and/or other advanced networks) can employ various artificial intelligence-based schemes for carrying out various aspects thereof. For example, a process for implementing service aware logic to determine one or more service characteristics that are needed (e.g., latency, throughput, delay jitter, packet loss), and so on can be enabled through an automatic classifier system and process.

A classifier is a function that maps an input attribute vector, x=(x1, x2, x3, x4, xn), to a confidence that the input belongs to a class. In other words, f(x)=confidence(class). Such classification can employ a probabilistic and/or statistical-based analysis (e.g., factoring into the analysis utilities and costs) to provide a prognosis and/or infer one or more actions that should be employed to facilitate a conditional fast return.

A Support Vector Machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that can be similar, but not necessarily identical to training data. Other directed and undirected model classification approaches (e.g., naïve Bayes, Bayesian networks, decision trees, neural networks, fuzzy logic models, and probabilistic classification models) providing different patterns of independence can be employed. Classification as used herein, can be inclusive of statistical regression that is utilized to develop models of priority.

One or more aspects can employ classifiers that are explicitly trained (e.g., through a generic training data) as well as classifiers that are implicitly trained (e.g., by observing equipment feedback associated with dynamic bandwidth allocation by receiving implicit information, based on an inference, and so on. For example, SVMs can be configured through a learning or training phase within a classifier constructor and feature selection module. Thus, a classifier(s) can be used to automatically learn and perform a number of functions, including but not limited to determining, according to a predetermined criterion, when to implement a delay, how to implement the delay (e.g., length of a time interval or multiple time intervals), when to redirect the UE to other network equipment, when to adjust a time interval, and so forth. The criteria can include, but is not limited to, historical information, feedback information, the type of application executing at the UE, measured signal information (e.g., QoS, power levels, and so on), evaluation of Service Level Agreements (SLAs), user preferences, and so forth.

Additionally, or alternatively, an implementation scheme (e.g., a rule, a policy, and so on) can be applied to control and/or regulate conditional fast return to stand alone advanced networks after voice fall back, and so forth. In some implementations, based upon a predefined criterion, the rules-based implementation can automatically and/or dynamically interpret whether a user experience will be improved by implementing a delay or immediately (or nearly immediately) facilitating a fast return. In response thereto, the rule-based implementation can automatically interpret and carry out functions associated with a conditional fast return by employing a predefined and/or programmed rule(s) based upon any desired criteria.

In further detail, the system 700 can continually monitor network equipment and associated network traffic conditions, applications executing on one or more UEs, service and/or traffic needs at the UE (e.g., based on SLA, user preferences, user expectations, and so on) to determine how a conditional fast return should be applied (e.g., via the machine learning and reasoning component 702). The system can detect one or more signals from the UE and/or network equipment. The machine learning and reasoning component 702 can facilitate execution of a process that analyzes the data. Based, at least in part, on the data, the machine learning and reasoning component 702 can determine when a delay should occur, the delay interval, to which network equipment the UE should be redirected, and so on. Depending on the decision, the system 700 (e.g., through its various components) can facilitate conditional fast return.

According to some implementations, seed data (e.g., a data set) can be utilized as initial input to the model 704 to facilitate the training of the model 704. In an example, if seed data is utilized, the seed data can be obtained from one or more historical data associated with service characteristics, network conditions, network traffic patterns, SLAs, user complaints, and/or other information indicative of service type and/or service considerations. However, the disclosed embodiments are not limited to this implementation and seed data is not necessary to facilitate training of the model 704. Instead, the model 704 can be trained on new data received (e.g., the input signals, a feedback loop, and so on).

The data (e.g., seed data and/or new data) can be collected and, optionally, labeled with various metadata. For example, the data can be labeled with an indication of the communication protocol being utilized for communication amongst the equipment, respective applications executing on the equipment, or other data, such as identification of respective equipment and the associated conditions and/or parameters expected at the UE, and so on.

Figure 8:
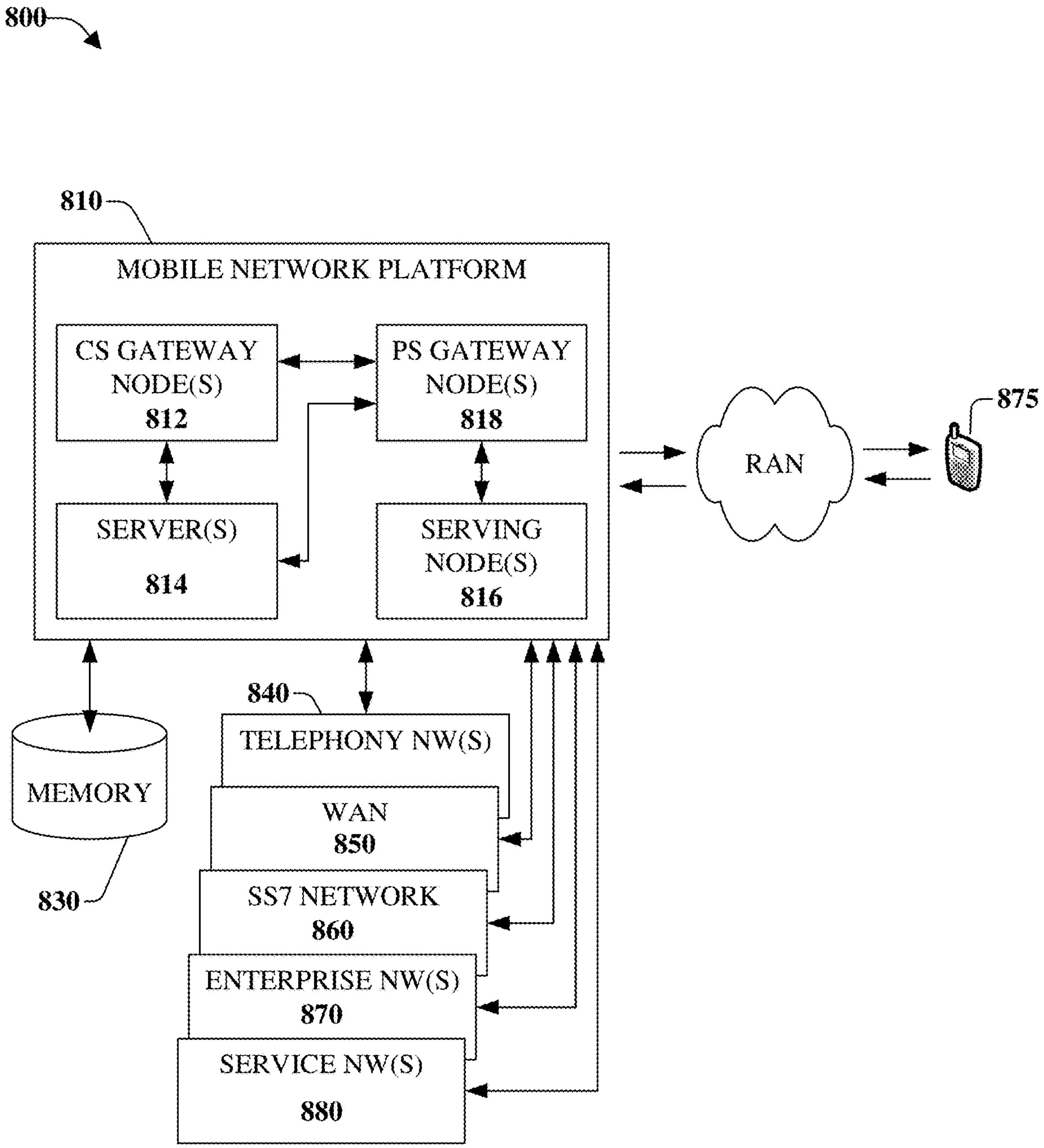
FIG. 8 illustrates an example block diagram of a non-limiting embodiment of a mobile network platform in accordance with various aspects described herein.

Described herein are systems, methods, articles of manufacture, non-transitory machine-readable medium, and other embodiments or implementations that can facilitate conditional fast return to stand alone advanced networks after voice fall back. FIG. 8 presents an example embodiment 800 of a mobile network platform 810 that can implement and exploit one or more aspects of the disclosed subject matter described herein. Generally, wireless network platform 810 can include components, e.g., nodes, gateways, interfaces, servers, or disparate platforms, that facilitate both packet-switched (PS) (e.g., Internet protocol (IP), frame relay, asynchronous transfer mode (ATM) and circuit-switched (CS) traffic (e.g., voice and data), as well as control generation for networked wireless telecommunication. As a non-limiting example, wireless network platform 810 can be included in telecommunications carrier networks, and can be considered carrier-side components as discussed elsewhere herein. Mobile network platform 810 includes CS gateway node(s) 812 which can interface CS traffic received from legacy networks such as telephony network(s) 840 (e.g., public switched telephone network (PSTN), or public land mobile network (PLMN)) or a signaling system #7 (SS7) network 860. Circuit switched gateway node(s) 812 can authorize and authenticate traffic (e.g., voice) arising from such networks. Additionally, CS gateway node(s) 812 can access mobility, or roaming, data generated through SS7 network 860; for instance, mobility data stored in a visited location register (VLR), which can reside in memory 830. Moreover, CS gateway node(s) 812 interfaces CS-based traffic and signaling and PS gateway node(s) 818. As an example, in a 3GPP UMTS network, CS gateway node(s) 812 can be realized at least in part in gateway GPRS support node(s) (GGSN). It should be appreciated that functionality and specific operation of CS gateway node(s) 812, PS gateway node(s) 818, and serving node(s) 816, is provided and dictated by radio technology(ies) utilized by mobile network platform 810 for telecommunication. Mobile network platform 810 can also include the MMEs, HSS/PCRFs, SGWs, and PGWs disclosed herein.

In addition to receiving and processing CS-switched traffic and signaling, PS gateway node(s) 818 can authorize and authenticate PS-based data sessions with served mobile devices. Data sessions can include traffic, or content(s), exchanged with networks external to the wireless network platform 810, like wide area network(s) (WANs) 850, enterprise network(s) 870, and service network(s) 880, which can be embodied in local area network(s) (LANs), can also be interfaced with mobile network platform 810 through PS gateway node(s) 818. It is to be noted that WANs 850 and enterprise network(s) 870 can embody, at least in part, a service network(s) such as IP multimedia subsystem (IMS). Based on radio technology layer(s) available in technology resource(s) 817, packet-switched gateway node(s) 818 can generate packet data protocol contexts when a data session is established; other data structures that facilitate routing of packetized data also can be generated. To that end, in an aspect, PS gateway node(s) 818 can include a tunnel interface (e.g., tunnel termination gateway (TTG) in 3GPP UMTS network(s) (not shown)) which can facilitate packetized communication with disparate wireless network(s), such as Wi-Fi networks.

In embodiment 800, wireless network platform 810 also includes serving node(s) 816 that, based upon available radio technology layer(s) within technology resource(s) 817, convey the various packetized flows of data streams received through PS gateway node(s) 818. It is to be noted that for technology resource(s) 817 that rely primarily on CS communication, server node(s) can deliver traffic without reliance on PS gateway node(s) 818; for example, server node(s) can embody at least in part a mobile switching center. As an example, in a 3GPP UMTS network, serving node(s) 816 can be embodied in serving GPRS support node(s) (SGSN).

For radio technologies that exploit packetized communication, server(s) 814 in wireless network platform 810 can execute numerous applications that can generate multiple disparate packetized data streams or flows, and manage (e.g., schedule, queue, format, and so on) such flows. Such application(s) can include add-on features to standard services (for example, provisioning, billing, user support, and so forth) provided by wireless network platform 810. Data streams (e.g., content(s) that are part of a voice call or data session) can be conveyed to PS gateway node(s) 818 for authorization/authentication and initiation of a data session, and to serving node(s) 816 for communication thereafter. In addition to application server, server(s) 814 can include utility server(s), a utility server can include a provisioning server, an operations and maintenance server, a security server that can implement at least in part a certificate authority and firewalls as well as other security mechanisms, and the like. In an aspect, security server(s) secure communication served through wireless network platform 810 to ensure network's operation and data integrity in addition to authorization and authentication procedures that CS gateway node(s) 812 and PS gateway node(s) 818 can enact. Moreover, provisioning server(s) can provision services from external network(s) like networks operated by a disparate service provider; for instance, WAN 850 or Global Positioning System (GPS) network(s) (not shown). Provisioning server(s) can also provision coverage through networks associated to wireless network platform 810 (e.g., deployed and operated by the same service provider), such as femto-cell network(s) (not shown) that enhance wireless service coverage within indoor confined spaces and offload RAN resources in order to enhance subscriber service experience within a home or business environment by way of UE 875.

It is to be noted that server(s) 814 can include one or more processors configured to confer at least in part the functionality of macro network platform 810. To that end, the one or more processors can execute code instructions stored in memory 830, for example. It should be appreciated that server(s) 814 can include a content manager 815, which operates in substantially the same manner as described hereinbefore.

In example embodiment 800, memory 830 can store information related to operation of wireless network platform 810. Other operational information can include provisioning information of mobile devices served through wireless network platform 810, subscriber databases; application intelligence, pricing schemes, e.g., promotional rates, flatrate programs, couponing campaigns; technical specification(s) consistent with telecommunication protocols for operation of disparate radio, or wireless, technology layers; and so forth. Memory 830 can also store information from at least one of telephony network(s) 840, WAN 850, enterprise network(s) 870, or SS7 network 860. In an aspect, memory 830 can be, for example, accessed as part of a data store component or as a remotely connected memory store.

Figure 9:
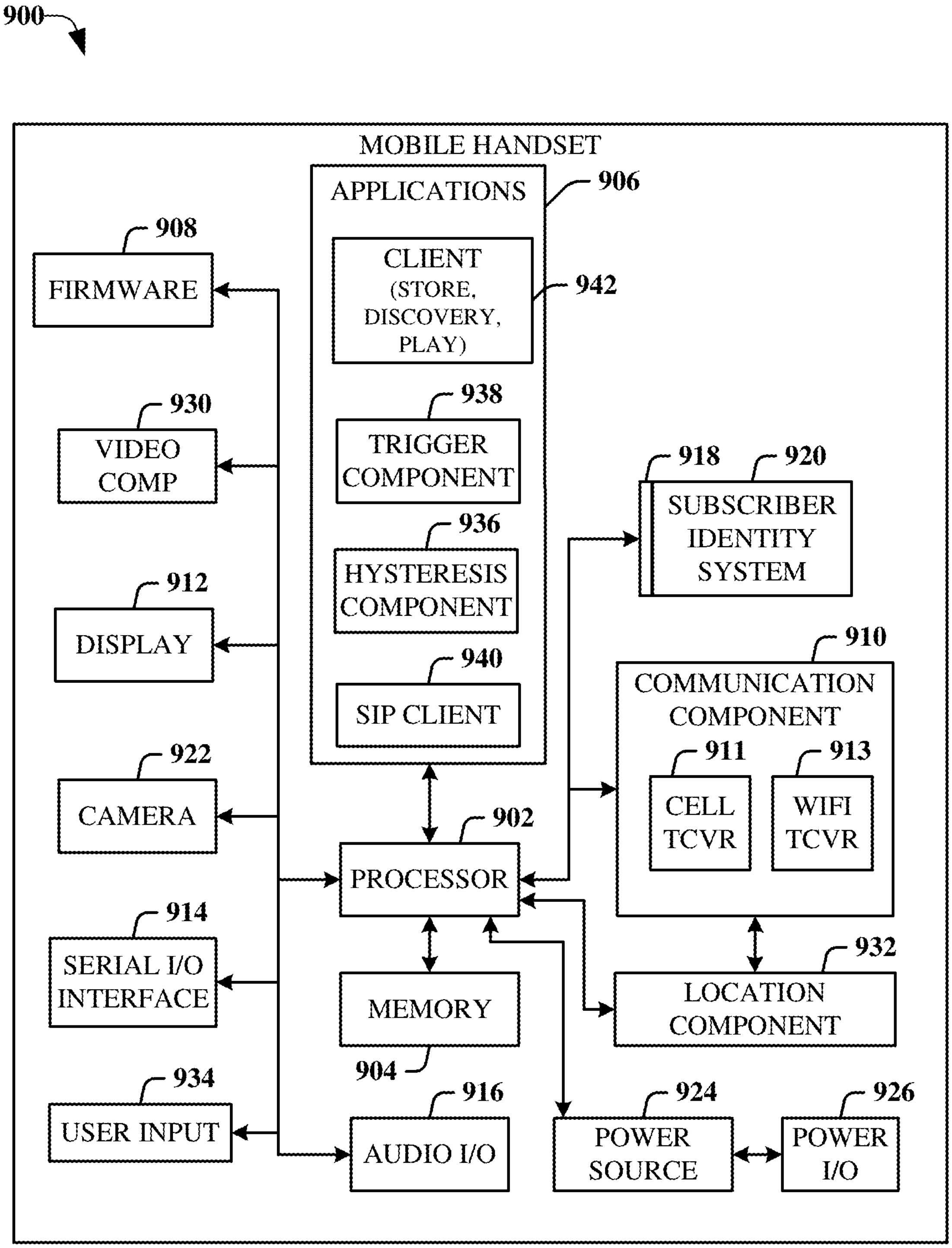
FIG. 9 illustrates an example, non-limiting, block diagram of a handset operable to engage in a system architecture that facilitates wireless communications according to one or more embodiments described herein.

Referring now to FIG. 9, illustrated is an example, non-limiting, block diagram of a handset 900 operable to engage in a system architecture that facilitates wireless communications according to one or more embodiments described herein. Although a mobile handset is illustrated herein, it will be understood that other devices can be a mobile device and/or UE, and that the mobile handset is merely illustrated to provide context for the embodiments of the various embodiments described herein. The following discussion is intended to provide a brief, general description of an example of a suitable environment in which the various embodiments can be implemented. While the description includes a general context of computer-executable instructions embodied on a machine-readable storage medium, those skilled in the art will recognize that the various embodiments also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can include computer storage media and communication media. Computer storage media can include volatile and/or non-volatile media, removable and/or non-removable media implemented in any method or technology for storage of information, such as computer-readable instructions, data structures, program modules, or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information, and which can be accessed by the computer.

Communication media typically embodies computer-readable instructions, data structures, program modules, or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset includes a processor 902 for controlling and processing all onboard operations and functions. A memory 904 interfaces to the processor 902 for storage of data and one or more applications 906 (e.g., a video player software, user feedback component software, etc.). Other applications can include voice recognition of predetermined voice commands that facilitate initiation of the user feedback signals. The applications 906 can be stored in the memory 904 and/or in a firmware 908, and executed by the processor 902 from either or both the memory 904 or/and the firmware 908. The firmware 908 can also store startup code for execution in initializing the handset 900. A communications component 910 interfaces to the processor 902 to facilitate wired/wireless communication with external systems, e.g., cellular networks, VoIP networks, and so on. Here, the communications component 910 can also include a suitable cellular transceiver 911 (e.g., a GSM transceiver) and/or an unlicensed transceiver 913 (e.g., Wi-Fi, WiMax) for corresponding signal communications. The handset 900 can be a device such as a cellular telephone, a PDA with mobile communications capabilities, and messaging-centric devices. The communications component 910 also facilitates communications reception from terrestrial radio networks (e.g., broadcast), digital satellite radio networks, and Internet-based radio services networks.

The handset 900 includes a display 912 for displaying text, images, video, telephony functions (e.g., a Caller ID function), setup functions, and for user input. For example, the display 912 can also be referred to as a "screen" that can accommodate the presentation of multimedia content (e.g., music metadata, messages, wallpaper, graphics, etc.). The display 912 can also display videos and can facilitate the generation, editing and sharing of video quotes. A serial I/O interface 914 is provided in communication with the processor 902 to facilitate wired and/or wireless serial communications (e.g., USB, and/or IEEE 1394) through a hardwire connection, and other serial input devices (e.g., a keyboard, keypad, and mouse). This can support updating and troubleshooting the handset 900, for example. Audio capabilities are provided with an audio I/O component 916, which can include a speaker for the output of audio signals related to, for example, indication that the user pressed the proper key or key combination to initiate the user feedback signal. The audio I/O component 916 also facilitates the input of audio signals through a microphone to record data and/or telephony voice data, and for inputting voice signals for telephone conversations.

The handset 900 can include a slot interface 918 for accommodating a SIC (Subscriber Identity Component) in the form factor of a card Subscriber Identity Module (SIM) or universal SIM 920, and interfacing the SIM card 920 with the processor 902. However, it is to be appreciated that the SIM card 920 can be manufactured into the handset 900, and updated by downloading data and software.

The handset 900 can process IP data traffic through the communications component 910 to accommodate IP traffic from an IP network such as, for example, the Internet, a corporate intranet, a home network, a person area network, etc., through an ISP or broadband cable provider. Thus, VoIP traffic can be utilized by the handset 900 and IP-based multimedia content can be received in either an encoded or decoded format.

A video processing component 922 (e.g., a camera) can be provided for decoding encoded multimedia content. The video processing component 922 can aid in facilitating the generation, editing, and sharing of video quotes. The handset 900 also includes a power source 924 in the form of batteries and/or an AC power subsystem, which power source 924 can interface to an external power system or charging equipment (not shown) by a power I/O component 926.

The handset 900 can also include a video component 930 for processing video content received and, for recording and transmitting video content. For example, the video component 930 can facilitate the generation, editing and sharing of video quotes. A location tracking component 932 facilitates geographically locating the handset 900. As described hereinabove, this can occur when the user initiates the feedback signal automatically or manually. A user input component 934 facilitates the user initiating the quality feedback signal. The user input component 934 can also facilitate the generation, editing and sharing of video quotes. The user input component 934 can include such conventional input device technologies such as a keypad, keyboard, mouse, stylus pen, and/or touchscreen, for example.

Referring again to the applications 906, a hysteresis component 936 facilitates the analysis and processing of hysteresis data, which is utilized to determine when to associate with the access point. A software trigger component 938 can be provided that facilitates triggering of the hysteresis component 936 when the Wi-Fi transceiver 913 detects the beacon of the access point. A SIP client 940 enables the handset 900 to support SIP protocols and register the subscriber with the SIP registrar server. The applications 906 can also include a client 942 that provides at least the capability of discovery, play and store of multimedia content, for example, music.

The handset 900, as indicated above related to the communications component 910, includes an indoor network radio transceiver 913 (e.g., Wi-Fi transceiver). This function supports the indoor radio link, such as IEEE 802.11, for a dual-mode GSM handset. The handset 900 can accommodate at least satellite radio services through a handset that can combine wireless voice and digital radio chipsets into a single handheld device.

Figure 10:
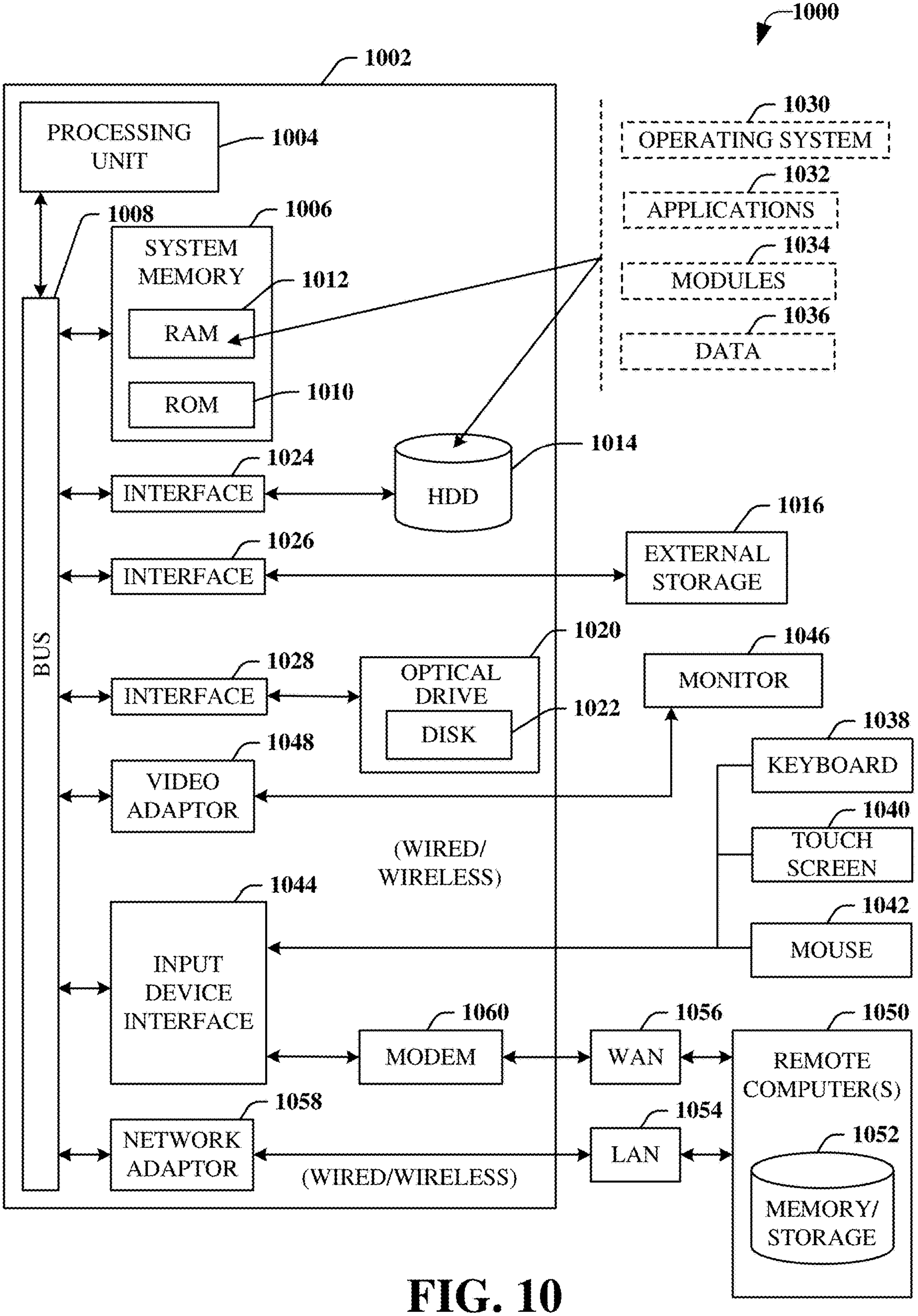
FIG. 10 illustrates an example, non-limiting, block diagram of a computer operable to engage in a system architecture that facilitates wireless communications according to one or more embodiments described herein.

In order to provide additional context for various embodiments described herein, FIG. 10 and the following discussion are intended to provide a brief, general description of a suitable computing environment 1000 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments of the aspects described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A Basic Input/Output System (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), one or more external storage devices 1016 (e.g., a magnetic floppy disk drive (FDD) 1016, a memory stick or flash drive reader, a memory card reader, etc.) and a drive 1020, e.g., such as a solid state drive, an optical disk drive, which can read or write from a disk 1022, such as a CD-ROM disc, a DVD, a BD, etc. Alternatively, where a solid state drive is involved, disk 1022 would not be included, unless separate. While the internal HDD 1014 is illustrated as located within the computer 1002, the internal HDD 1014 can also be configured for external use in a suitable chassis (not shown). Additionally, while not shown in environment 1000, a solid state drive (SSD) could be used in addition to, or in place of, an HDD 1014. The HDD 1014, external storage device(s) 1016 and drive 1020 can be connected to the system bus 1008 by an HDD interface 1024, an external storage interface 1026 and a drive interface 1028, respectively. The interface 1024 for external drive implementations can include at least one or both of Universal Serial Bus (USB) and Institute of Electrical and Electronics Engineers (IEEE) 1294 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally include emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can include one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can be enable with a security module, such as a trusted processing module (TPM). For example, with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1394 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the Internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are example and other means of establishing a communications link between the computers can be used.

When used in either a LAN or WAN networking environment, the computer 1002 can access cloud storage systems or other network-based storage systems in addition to, or in place of, external storage devices 1016 as described above, such as but not limited to a network virtual machine providing one or more aspects of storage or processing of information. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

An aspect of 5G, which differentiates from previous 4G systems, is the use of NR. NR architecture can be designed to support multiple deployment cases for independent configuration of resources used for RACH procedures. Since the NR can provide additional services than those provided by LTE, efficiencies can be generated by leveraging the pros and cons of LTE and NR to facilitate the interplay between LTE and NR, as discussed herein.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics can be combined in any suitable manner in one or more embodiments.

As used in this disclosure, in some embodiments, the terms "component," "system," "interface," and the like are intended to refer to, or can include a computer-related entity or an entity related to an operational apparatus with one or more specific functionalities, wherein the entity can be either hardware, a combination of hardware and software, software, or software in execution, and/or firmware. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by one or more processors, wherein the processor can be internal or external to the apparatus and can execute at least a part of the software or firmware application. As yet another example, a component can be an apparatus that provides specific functionality through electronic components without mechanical parts, the electronic components can include a processor therein to execute software or firmware that confer(s) at least in part the functionality of the electronic components. In an aspect, a component can emulate an electronic component via a virtual machine, e.g., within a cloud computing system. While various components have been illustrated as separate components, it will be appreciated that multiple components can be implemented as a single component, or a single component can be implemented as multiple components, without departing from example embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "mobile device equipment," "mobile station," "mobile," subscriber station," "access terminal," "terminal," "handset," "communication device," "mobile device," "user equipment" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," BS transceiver, BS device, cell site, cell site device, "Node B (NB)," "evolved Node B (eNode B)," "home Node B (HNB)" and the like, are utilized interchangeably in the application, and refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "device," "communication device," "mobile device," "subscriber," "customer entity," "consumer," "customer entity," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Embodiments described herein can be exploited in substantially any wireless communication technology, including, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Z-Wave, Zigbee and other 802.XX wireless technologies and/or legacy telecommunication technologies.

The various aspects described herein can relate to New Radio (NR), which can be deployed as a standalone radio access technology or as a non-standalone radio access technology assisted by another radio access technology, such as Long Term Evolution (LTE), for example. It should be noted that although various aspects and embodiments have been described herein in the context of 5G, Universal Mobile Telecommunications System (UMTS), and/or Long Term Evolution (LTE), or other next generation networks, the disclosed aspects are not limited to 5G, 6G, a UMTS implementation, and/or an LTE implementation as the techniques can also be applied in 3G, 4G, or LTE systems. For example, aspects or features of the disclosed embodiments can be exploited in substantially any wireless communication technology. Such wireless communication technologies can include UMTS, Code Division Multiple Access (CDMA), Wi-Fi, Worldwide Interoperability for Microwave Access (WiMAX), General Packet Radio Service (GPRS), Enhanced GPRS, Third Generation Partnership Project (3GPP), LTE, Third Generation Partnership Project 2 (3GPP2) Ultra Mobile Broadband (UMB), High Speed Packet Access (HSPA), Evolved High Speed Packet Access (HSPA+), High-Speed Downlink Packet Access (HSDPA), High-Speed Uplink Packet Access (HSUPA), Zigbee, or another IEEE 802.XX technology. Additionally, substantially all aspects disclosed herein can be exploited in legacy telecommunication technologies.

As used herein, "5G" can also be referred to as NR access. Accordingly, systems, methods, and/or machine-readable storage media for facilitating link adaptation of downlink control channel for 5G systems are desired. As used herein, one or more aspects of a 5G network can include, but is not limited to, data rates of several tens of megabits per second (Mbps) supported for tens of thousands of users; at least one gigabit per second (Gbps) to be offered simultaneously to tens of users (e.g., tens of workers on the same office floor); several hundreds of thousands of simultaneous connections supported for massive sensor deployments; spectral efficiency significantly enhanced compared to 4G; improvement in coverage relative to 4G; signaling efficiency enhanced compared to 4G; and/or latency significantly reduced compared to LTE.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification procedures and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the various embodiments can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, machine-readable device, computer-readable carrier, computer-readable media, machine-readable media, computer-readable (or machine-readable) storage/communication media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media. Of course, those skilled in the art will recognize many modifications can be made to this configuration without departing from the scope or spirit of the various embodiments The terms "real-time," "near real-time," "dynamically," "instantaneous," "continuously," and the like are employed interchangeably or similarly throughout the subject specification, unless context warrants particular distinction(s) among the terms. It should be noted that such terms can refer to data which is collected and processed at an order without perceivable delay for a given context, the timeliness of data or information that has been delayed only by the time required for electronic communication, actual or near actual time during which a process or event occur, and temporally present conditions as measured by real-time software, real-time systems, and/or high-performance computing systems. Real-time software and/or performance can be employed via synchronous or non-synchronous programming languages, real-time operating systems, and real-time networks, each of which provide frameworks on which to build a real-time software application. A real-time system may be one where its application can be considered (within context) to be a main priority. In a real-time process, the analyzed (input) and generated (output) samples can be processed (or generated) continuously at the same time (or near the same time) it takes to input and output the same set of samples independent of any processing delay.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the subject matter has been described herein in connection with various embodiments and corresponding figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:

receiving, from a first network equipment by a second network equipment comprising a memory and a processor, a connection request that comprises an indication of a fall back procedure, wherein the connection request is associated with a user equipment via which a voice communication is scheduled to occur;

facilitating, by the second network equipment, control of the voice communication for the user equipment;

obtaining, by the second network equipment from a third network equipment via an inter-node interface, service quality information comprising performance statistics indicative of an ability of the third network equipment to support a data centric application that is executing at the user equipment;

after a first determination that the voice communication has completed at the user equipment, determining, by the second network equipment, whether a condition at the third network equipment fails to satisfy a defined condition associated with the data centric application that is executing at the user equipment, that is facilitated by the first network equipment, and that is distinct from an application on the user equipment for the voice communication, wherein the defined condition is associated with (1) a latency criterion, a throughput criterion, and/or a delay jitter criterion related to the data centric application and (2) the service quality information;

delaying, by the second network equipment, a release of the control of the user equipment from the second network equipment to the third network equipment based on a second determination that the condition fails to satisfy the defined condition, wherein the delaying involves initiation of a timer;

upon or after expiration of the timer, further delaying, by the second network equipment, the release of the control of the user equipment based on a particular determination that the condition has not changed, wherein the further delaying involves re-initiation of the timer or initiation of another timer; and upon or after expiration of the re-initiated timer or the another timer, repeating, by the second network equipment, the further delaying until a subsequent determination is made that the data centric application is no longer executing at the user equipment.

2. The method of claim 1, wherein the method further comprises:

after expiration of a defined interval and based on a third determination that the data centric application that is executing at the user equipment has completed, triggering, by the second network equipment, the release of the control of the user equipment from the second network equipment; and redirecting, by the second network equipment, the user equipment to the third network equipment, wherein the third network equipment is selected based on a capability of the user equipment.

3. The method of claim 2, further comprising:

prior to triggering the release of the user equipment, evaluating, by the second network equipment, the capability of the user equipment based on the first determination that the voice communication has completed at the user equipment.

4. The method of claim 2, wherein receiving the indication of the fall back procedure comprises receiving an information element that comprises a release cause code.

5. The method of claim 4, wherein the information element is a first information element, and wherein redirecting the user equipment to the third network equipment comprises receiving a second information element that comprises redirected carrier information.

6. The method of claim 1, wherein the defined condition is identified for an uplink transmission.

7. The method of claim 1, wherein the defined condition is identified for a downlink transmission.

8. The method of claim 1, wherein the data centric application that is executing at the user equipment is a latency and interruption sensitive application, and wherein the defined condition is a latency criterion of network traffic.

9. The method of claim 1, wherein the defined condition is a throughput criterion of network traffic utilized by the data centric application that is executing on the user equipment.

10. The method of claim 1, wherein the defined condition is a delay jitter criterion of network traffic utilized by the data centric application that is executing on the user equipment.

11. The method of claim 1, wherein the defined condition is further associated with a packet loss threshold associated with the data centric application that is executing on the user equipment.

12. The method of claim 1, wherein the first network equipment is configured to operate according to a new radio network communication protocol.

13. The method of claim 1, wherein the first network equipment is deployed in a standalone deployment architecture.

14. The method of claim 1, wherein the second network equipment is configured to operate according to a long term evolution network communication protocol.

15. A system, comprising:

a processor; and a memory that stores executable instructions that, when executed by the processor, facilitate performance of operations, comprising:

controlling a first communication for a user equipment based on a connection request that comprises an indication of a fall back procedure, wherein the connection request is associated with the user equipment via which the first communication is scheduled to occur, wherein the connection request is received from a network equipment, and wherein the first communication comprises a voice communication;

obtaining, from the network equipment via an inter-node interface, service quality information comprising performance statistics indicative of an ability of the network equipment to support a data centric service that is executing at the user equipment;

after a first determination that the first communication has completed at the user equipment, determining whether a condition defined for the data centric service that is executing on the user equipment is supportable by the network equipment, wherein the data centric service is distinct from a service on the user equipment for the voice communication, wherein the condition defined for the data centric service is associated with a latency criterion, a throughput criterion, and/or a delay jitter criterion related to the data centric service and the service quality information;

delaying a redirection of the user equipment to the network equipment for control of a second communication scheduled to occur at the user equipment based on a second determination that the condition defined for the data centric service executing on the user equipment is not supportable by the network equipment, wherein the delaying involves initiation of a timer;

upon or after expiration of the timer, further delaying the redirection of the user equipment based on a particular determination that the condition has not changed, wherein the further delaying involves re-initiation of the timer or initiation of another timer; and upon or after expiration of the re-initiated timer or the another timer, repeating the further delaying until a subsequent determination is made that the data centric service is no longer executing on the user equipment.

16. The system of claim 15, wherein the indication comprises a first information element that comprises a release cause code, and wherein the operations further comprise redirecting the user equipment to the network equipment, wherein the redirecting comprises receiving a second information element that comprises redirected carrier information.

17. The system of claim 15, wherein the operations further comprise:

after a defined interval and based on a third determination that the service executing on the user equipment has completed, releasing a control of the user equipment to the network equipment.

18. A non-transitory machine-readable medium, comprising executable instructions that, when executed by a processor of a first network equipment, facilitate performance of operations, comprising:

determining that a first communication of a user equipment is to be controlled by a second network equipment based on a connection request that comprises an indication of a fall back procedure, wherein the first communication comprises a voice communication;

enabling control of the first communication by the second network equipment for a duration of the first communication;

obtaining, by the second network equipment from a third network equipment via an inter-node interface, service quality information comprising performance statistics indicative of an ability of the third network equipment to support a data centric application executing at the user equipment;

after a first determination that the first communication has completed at the user equipment, determining, based on the service quality information, whether the third network equipment fails to support a service criterion associated with the data centric application executing at the user equipment, that is facilitated by the first network equipment, wherein the data centric application is distinct from an application on the user equipment for the voice communication;

delaying a release of the control of the user equipment by the second network equipment based on a second determination that the third network equipment fails to support the service criterion, wherein the delaying involves initiation of a timer;

upon or after expiration of the timer, further delaying the release of the control of the user equipment based on a particular determination that the third network equipment fails to support the service criterion, wherein the further delaying involves re-initiation of the timer or initiation of another timer;

upon or after expiration of the re-initiated timer or the another timer, repeating the further delaying until a subsequent determination is made that the data centric application is no longer executing at the user equipment; and based on the subsequent determination, causing the control of the user equipment to be transferred to the third network equipment from the second network equipment.

19. The non-transitory machine-readable medium of claim 18, wherein the operations further comprise:

prior to the determining that the first communication is to be controlled by the second network equipment, receiving the indication of the fall back procedure and an information element that comprises a release cause code.

20. The non-transitory machine-readable medium of claim 18, wherein the service criterion is defined for at least one of an uplink transmission or a downlink transmission.

* * * * *